United States Patent
Durai et al.

(10) Patent No.: US 10,554,964 B1
(45) Date of Patent: Feb. 4, 2020

(54) TEST SYSTEM AND METHOD USING DETECTION PATTERNS

(71) Applicant: Rohde & Schwarz GmbH & Co. KG, Munich (DE)

(72) Inventors: Rajashekar Durai, Singapore (SG); Fernando Schmitt, Silver Spring, MD (US); Chun Guan Tay, Singapore (SG); Gerson Calamba Bacor, Victoria (AU); Sheheen Muhamed, Singapore (SG)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/112,610

(22) Filed: Aug. 24, 2018

(51) Int. Cl.
*H04N 17/04* (2006.01)
*H04W 36/16* (2009.01)

(52) U.S. Cl.
CPC .......... *H04N 17/04* (2013.01); *H04W 36/16* (2013.01)

(58) Field of Classification Search
CPC .......... G11C 2029/4402; H04N 17/004; H04B 17/0087
See application file for complete search history.

(56) References Cited

U.S. PATENT DOCUMENTS

| | | | | |
|---|---|---|---|---|
| 5,600,432 A * | 2/1997 | Lengyel | ............ | G02B 27/42 356/124.5 |
| 6,108,041 A * | 8/2000 | Faroudja | ............ | H04N 7/0112 348/426.1 |
| 7,391,434 B2 * | 6/2008 | Yang | ............ | H04N 17/004 348/181 |
| 7,817,184 B1 * | 10/2010 | Michener | ............ | H04N 17/04 348/189 |
| 8,780,210 B1 * | 7/2014 | Steinberg | ............ | H04N 17/004 348/187 |
| 9,417,286 B2 * | 8/2016 | Martin | ............ | G01R 31/318547 |
| 9,723,302 B2 * | 8/2017 | Tay | ............ | G06K 7/1095 |
| 2008/0089251 A1 * | 4/2008 | Gallego | ............ | H04W 8/082 370/277 |
| 2009/0156198 A1 * | 6/2009 | Lee | ............ | H04W 24/08 455/425 |
| 2010/0113023 A1 * | 5/2010 | Huang | ............ | H04W 52/0216 455/436 |
| 2010/0248641 A1 * | 9/2010 | Schumacher | ............ | H04B 7/0689 455/67.14 |
| 2011/0142008 A1 * | 6/2011 | Choi | ............ | H04W 36/04 370/332 |
| 2016/0094842 A1 * | 3/2016 | Ho | ............ | H04N 17/004 348/181 |
| 2016/0165226 A1 * | 6/2016 | Djurdjevic | ............ | G06T 7/80 348/188 |
| 2017/0150140 A1 * | 5/2017 | Nufer | ............ | H04N 21/23439 |

\* cited by examiner

*Primary Examiner* — Paulos M Natnael
(74) *Attorney, Agent, or Firm* — Potomac Technology Law, LLC

(57) ABSTRACT

A test system is provided. Said test system comprises a device under test, a measurement equipment, and a remote source simulator. In this context, the remote source simulator is adapted to simulate a remote video source, wherein the remote video source is adapted to transmit a video comprising at least one detection pattern to the device under test. Furthermore, the device under test is adapted to display the video. In addition to this, the measurement equipment is adapted to detect the at least one detection pattern with respect to the device under test and to determine the number of detection patterns having been received by the device under test.

13 Claims, 4 Drawing Sheets

TEST SYSTEM AND METHOD USING DETECTION PATTERNS

TECHNICAL FIELD

The invention relates to a test system and a corresponding test method, especially for video streaming performance tests during handover and offloading scenarios.

BACKGROUND

Generally, in times of an increasing number of applications providing video streaming capabilities on the basis of heterogeneous wireless networks, there is a growing need of a test system and a corresponding test method especially for verifying correct functioning of said applications with special respect to video streaming performance tests during handover and offloading scenarios, thereby allowing for testing in an efficient and cost-effective manner.

U.S. Pat. No. 9,723,302 B2 discloses a measuring system for measuring video processing quality of a device under test. The measuring system includes a measuring device comprising transmission means set up for transmitting a video to the device under test. The device under test is set up for receiving the video and displaying it using a display included by the device under test. The video includes at least a first barcode to be displayed for a first duration. The measuring system includes a barcode reader set up for reading the first barcode from the display of the device under test. The measuring system is set up for determining the video processing quality of the device under test based upon measuring results of the barcode reader. As it can be seen, said measuring system does not allow for video streaming performance tests during handover and offloading scenarios.

Accordingly, there is a need to provide a test system and a corresponding test method, especially for video streaming performance tests during handover and offloading scenarios, each of which ensures both a high efficiency and reduced costs.

SOME EXAMPLE EMBODIMENTS

Embodiments of the present invention advantageously address the foregoing requirements and needs, as well as others, by providing a test system and a corresponding test method, especially for video streaming performance tests during handover and offloading scenarios, each of which ensures both a high efficiency and reduced costs.

According to a first aspect of the invention, a test system is provided. Said test system comprises a device under test, a measurement equipment, and a remote source simulator. In this context, the remote source simulator is adapted to simulate a remote video source, wherein the remote video source is adapted to transmit a video comprising at least one detection pattern to the device under test. Furthermore, the device under test is adapted to display the video. In addition to this, the measurement equipment is adapted to detect the at least one detection pattern with respect to the device under test and to determine the number of detection patterns having been received by the device under test. Advantageously, this allows for performing video streaming performance tests in a highly efficient and cost-effective manner.

According to a first implementation form of said first aspect of the invention, the measurement equipment is further adapted to determine if all detection patterns have been transmitted. Advantageously, in this manner, complexity, and thus costs, can further be reduced.

According to a second implementation form of said first aspect of the invention, each frame of the video comprises one detection pattern. Advantageously, for instance, measurement accuracy can be increased.

According to a further implementation form of said first aspect of the invention, each detection pattern comprises a representation of a number being incremented with each frame. Advantageously, for example, measurement accuracy and efficiency can further be increased.

According to a further implementation form of said first aspect of the invention, the at least one detection pattern comprises a barcode, a quick response code, or any optical pattern. Advantageously, complexity can further be reduced.

According to a further implementation form of said first aspect of the invention, the at least one detection pattern comprises an acoustical pattern. Advantageously, for instance, complexity can further be reduced.

According to a further implementation form of said first aspect of the invention, the remote video source comprises a long term evolution source, a code division multiple access source, a wideband code division multiple access source, a wireless local area network source, or any wireless communication source. Advantageously, this allows for performance testing with respect to different kinds of sources, thereby increasing flexibility.

According to a further implementation form of said first aspect of the invention, the remote source simulator is further adapted to simulate a further remote video source and to handover the communication between the remote video source and the device under test to a communication between the further remote video source and the device under test. Advantageously, with special respect to handover scenarios, corresponding performance tests can be performed with an increased efficiency.

According to a further implementation form of said first aspect of the invention, the further remote video source comprises a long term evolution source, a code division multiple access source, a wideband code division multiple access source, a wireless local area network source, or any wireless communication source. Advantageously, this allows for performance testing with respect to different kinds of sources, thereby increasing flexibility.

According to a further implementation form of said first aspect of the invention, the measurement equipment is further adapted to measure the video quality of the respective video during handover. Advantageously, for instance, this allows also for quality testing, thereby increasing flexibility of the measurement system.

According to a further implementation form of said first aspect of the invention, the measurement equipment is further adapted to measure a number of missed video frames, frame delay, and/or jumbled frames, especially frame order, in order to determine video quality. Advantageously, complexity, and thus costs, can further be reduced.

According to a further implementation form of said first aspect of the invention, the measurement equipment is further adapted to determine video quality on the basis of the number of detection patterns having been received by the device under test. Advantageously, complexity can further be reduced, thereby increasing efficiency.

According to a further implementation form of said first aspect of the invention, the measurement equipment is further adapted to measure a number of missed video frames, frame delay, and/or jumbled frames, especially frame order, in order to determine video quality during handover. Advantageously, with special respect to handover scenarios, complexity, and thus costs, can further be reduced.

According to a further implementation form of said first aspect of the invention, the measurement equipment is further adapted to determine video quality during handover on the basis of the number of detection patterns having been received by the device under test. Advantageously, with special respect to handover scenarios, complexity can further be reduced, thereby increasing efficiency.

According to a further implementation form of said first aspect of the invention, the handover comprises a horizontal handover and/or a vertical handover. Advantageously, flexibility can further be increased by allowing for performance testing with respect to different kinds of handover scenarios.

According to a further implementation form of said first aspect of the invention, the horizontal handover comprises a handover happening between two cells of the same wireless network.

According to a further implementation form of said first aspect of the invention, the vertical handover comprises an upward vertical handover and/or a downward vertical handover. Advantageously, flexibility can further be increased by allowing for performance testing with respect to different kinds of vertical handover scenarios.

According to a further implementation form of said first aspect of the invention, the upward vertical handover comprises a handover to a wireless network with a larger cell size and a lower bandwidth.

According to a further implementation form of said first aspect of the invention, the downward vertical handover comprises a handover to a wireless network with a smaller cell size and a higher bandwidth.

According to a second aspect of the invention, a test method is provided. Said test method comprises the steps of simulating a remote video source, transmitting a video comprising at least one detection pattern to a device under test with the aid of the remote video source, displaying the video with the aid of the device under test, detecting the at least one detection pattern with respect to the device under test, and determining the number of detection patterns having been received by the device under test. Advantageously, this allows for performing video streaming performance tests in a highly efficient and cost-effective manner.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention are now further explained with respect to the drawings by way of example only, and not for limitation. In the drawings.

DETAILED DESCRIPTION

A test system and a corresponding test method, especially for video streaming performance tests during handover and offloading scenarios, each of which ensures both a high efficiency and reduced costs, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 1:
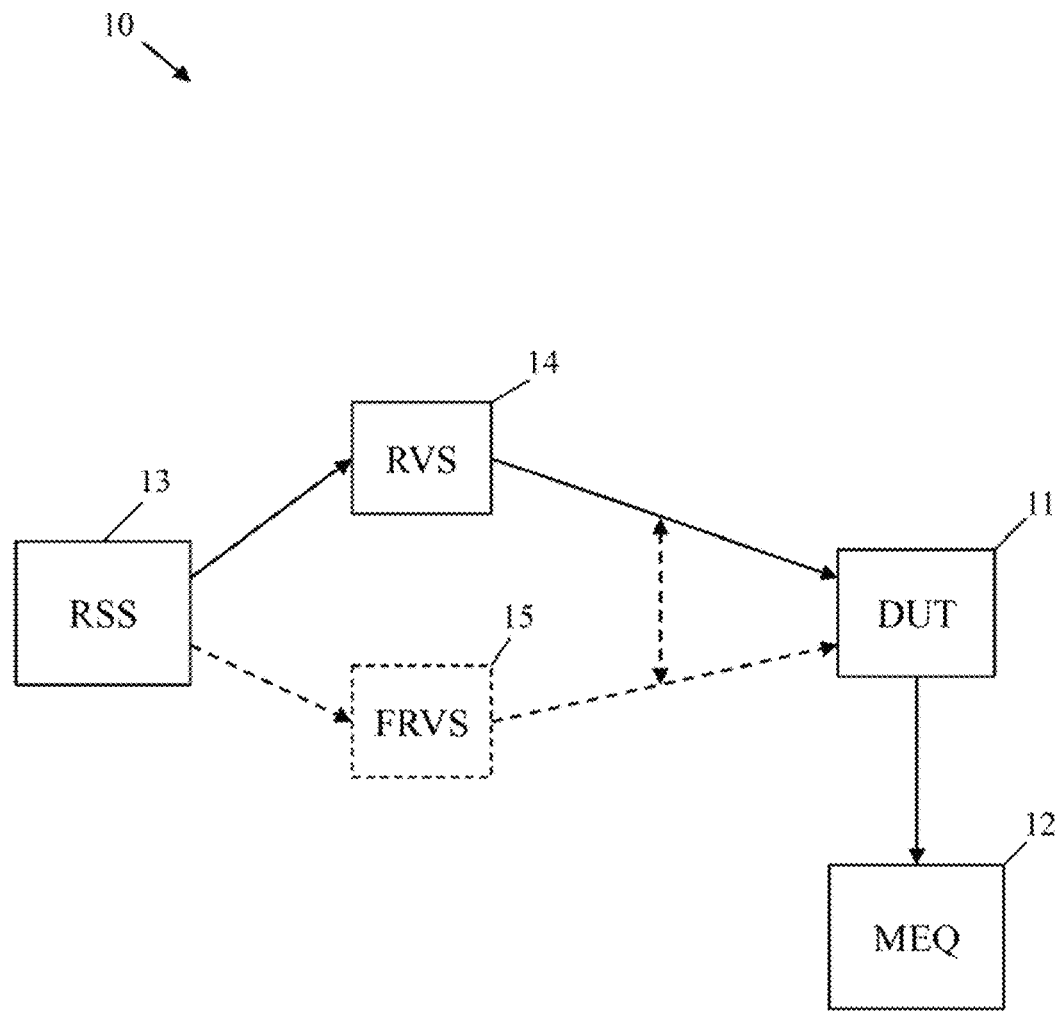
FIG. 1 shows an exemplary embodiment of a test system according to the first aspect of the invention.

Firstly, FIG. 1 illustrates an exemplary embodiment of the inventive test system 10. The test system 10 comprises a device under test 11, a measurement equipment 12, and a remote source simulator 13. In this context, the remote source simulator 13 is adapted to simulate a remote video source 14, wherein the remote video source 14 is adapted to transmit a video comprising at least one detection pattern to the device under test 11. Furthermore, the device under test 11 is adapted to display the video. In addition to this, the measurement equipment 12 is adapted to detect the at least one detection pattern with respect to the device under test 11 and to determine the number of detection patterns having been received by the device under test 11.

It is noted that it might be particularly advantageous if the measurement equipment 12 is further adapted to determine if all detection patterns have been transmitted.

Furthermore, each frame of the video may preferably comprise one detection pattern.

In addition to this, each detection pattern may especially comprise a representation of a number being incremented with each frame.

Additionally or alternatively, the at least one detection pattern may preferably comprise a barcode, a quick response code, or any optical pattern.

In further addition to this or as a further alternative, the at least one detection pattern may especially comprise an acoustical pattern.

It is further noted that the remote video source 14 may preferably comprise a long term evolution source, a code division multiple access source, a wideband code division multiple access source, a wireless local area network source, or any wireless communication source.

As it can further be seen according to FIG. 1, the remote source simulator 13 may further be adapted to simulate a further remote video source 15 and to handover the communication between the remote video source and the device under test to a communication between the further remote video source and the device under test.

In this context, the further remote video source 15 may preferably comprise a long term evolution source, a code division multiple access source, a wideband code division multiple access source, a wireless local area network source, or any wireless communication source.

Additionally or alternatively, the measurement equipment 12 may further be adapted to measure the video quality of the respective video during handover.

In further addition to this or as a further alternative, the measurement equipment 12 may further be adapted to measure a number of missed video frames, frame delay, and/or jumbled frames, especially frame order, in order to determine video quality.

Moreover, it might be particularly advantageous if the measurement equipment 12 is further adapted to determine video quality on the basis of the number of detection patterns having been received by the device under test 11.

Further advantageously, the measurement equipment 12 may preferably be adapted to measure a number of missed video frames, frame delay, and/or jumbled frames, especially frame order, in order to determine video quality during handover.

It is noted that the measurement equipment 12 may additionally or alternatively be adapted to determine video quality during handover on the basis of the number of detection patterns having been received by the device under test 11.

In this context, the handover may preferably comprise a horizontal handover and/or a vertical handover.

In addition to this, the horizontal handover may especially comprise a handover happening between two cells of the same wireless network.

In further addition to this, the vertical handover may preferably comprise an upward vertical handover and/or a downward vertical handover.

It is further noted that the upward vertical handover may especially comprise a handover to a wireless network with a larger cell size and a lower bandwidth.

Moreover, the downward vertical handover may preferably comprise a handover to a wireless network with a smaller cell size and a higher bandwidth.

Now, before two exemplary measurement plots according to FIG. 2 and FIG. 3 will be discussed, some general observations with respect to the invention and said two exemplary measurement plots or the corresponding underlying measurements, respectively, are stated in the following:

In general, streaming of video on a mobile device while roaming across heterogeneous wireless networks poses significant challenges due to the network latency, bandwidth variations, high error rates, speed of the user and other quality of service (QoS) requirements. Said wireless networks may be based on long term evolution (LTE), code division multiple access (CDMA), wideband code division multiple access (WCDMA), synchronous code division multiple access (SCDMA), time-division synchronous code division multiple access (TD-SCDMA), CDMA2000 evolution-data optimized (EV-DO), worldwide interoperability for microwave access (WiMAX), wireless local area network (WLAN) etc. In this context, Wi-Fi is technology for radio wireless local area networking of devices based on the IEEE 802.11 standards.

Furthermore, Wi-Fi data offloading is a special case of downward vertical handover from Non-Wi-Fi network, for instance, a mobile network such as LTE, to Wi-Fi Network. It is also possible to have Wi-Fi data onloading, which is a case of upward vertical handover from fixed Wi-Fi network to mobile network.

In all these handover scenarios, it is important to evaluate the quality of the streamed video from a user's perspective for any degradation due to frame loss or frame delay. The invention comes handy in this regard to benchmark the mobile phones or even the network infrastructure.

Figure 2:
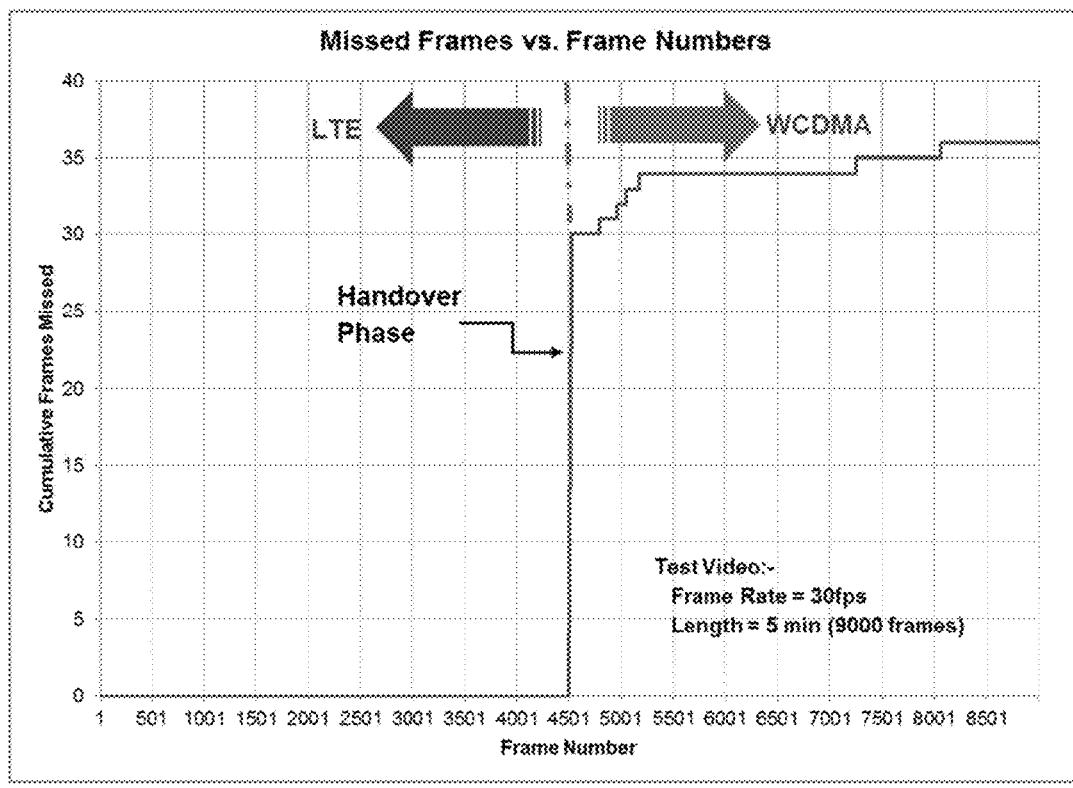
FIG. 2 shows an exemplary measurement plot with respect to a handover scenario.
Figure 3:
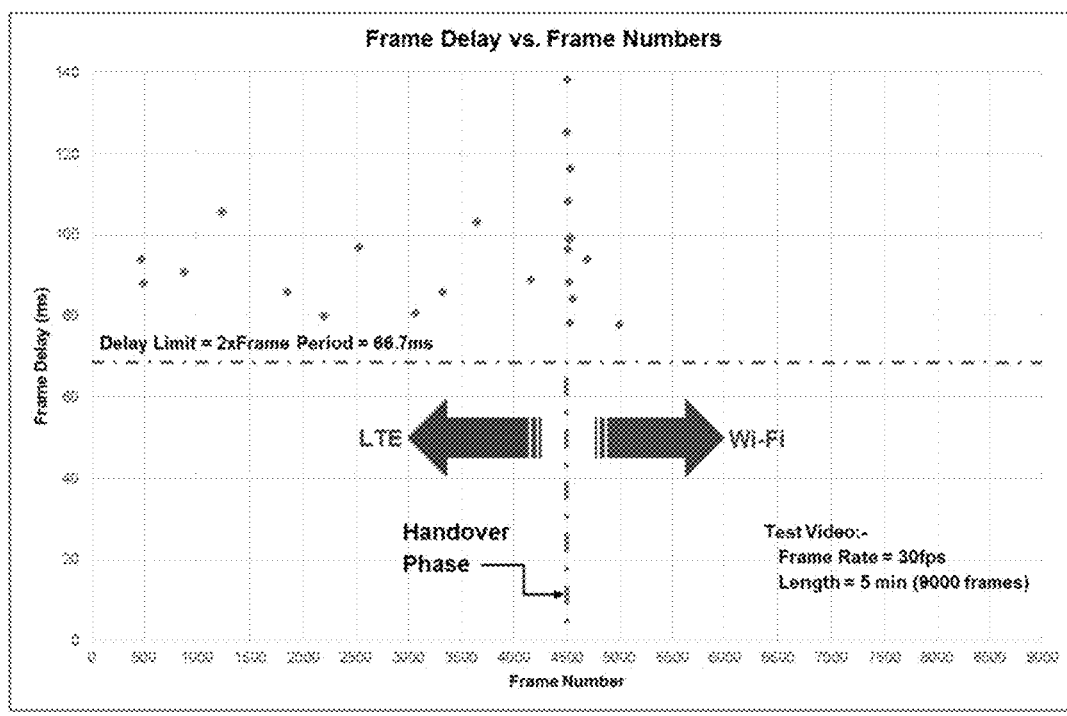
FIG. 3 shows an exemplary measurement plot with respect to an offloading scenario.

In order to get the exemplary measurement plots according to FIG. 2 and FIG. 3, a video with barcodes on each frame is streamed for the test. The barcode code scanner being especially comprised by the measurement equipment is setup to read the barcodes from the video frames throughout the video streaming process. The user especially has to make sure that the length of the video is sufficient to cover the three stages of handover—prior to the handover, during the handover and after the handover. Advantageously, any network disruption due to the handover can be detected down to the video frame interval.

In this context, FIG. 2 is a sample plot showing missed frames for a non-ideal vertical handover from LTE to WCDMA. Thirty frames are missed during the handover phase that lasted for 1 sec. Further frames are dropped as well in WCDMA network due to the bandwidth limitation. It is noted that similar charts can be plotted for Wi-Fi data offloading and other handover scenarios.

In addition to this, in FIG. 3, frame delay performance is shown in the scattered plot when Wi-Fi data offloading occurs from LTE. The delay limit is kept at twice the frame duration (2*33.33 ms=66.67 ms). Any frames arrived beyond the delay limit is plotted. The frames are found to have better delay performance when the video streaming switched from LTE to Wi-Fi. Higher frame delays are experienced in the handover phase as well compared to the average delay performance in LTE. Such is the case with other handover scenarios.

Figure 4:
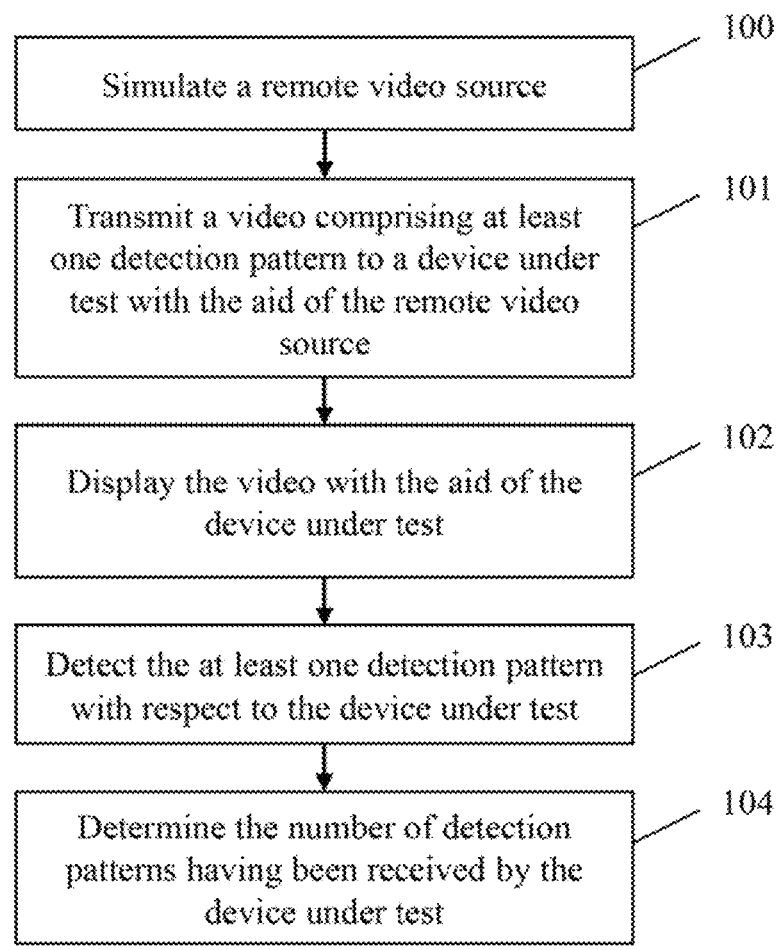
FIG. 4 shows a flow chart of an exemplary embodiment of the second aspect of the invention.

Finally, FIG. 4 shows a flow chart of an exemplary embodiment of the inventive test method. In a first step 100, a remote video source is simulated. Then, in a second step 101, a video comprising at least one detection pattern is transmitted to a device under test with the aid of the remote video source. Furthermore, in a third step 102, the video is displayed with the aid of the device under test. Moreover, in a fourth step 103, the at least one detection pattern is detected with respect to the device under test. In addition to this, in a fifth step 104, the number of detection patterns having been received by the device under test is determined.

It is noted that the test method may further comprise the step of determining if all detection patterns have been transmitted.

In this context, it might be particularly advantageous if each frame of the video comprises one detection pattern.

In addition to this, each detection pattern may preferably comprise a representation of a number being incremented with each frame.

Furthermore, it is noted that the at least one detection pattern may preferably comprise a barcode, a quick response code, or any optical pattern.

It might be further advantageous if the at least one detection pattern may especially comprise an acoustical pattern.

In addition to this or as an alternative, the remote video source may especially comprise a long term evolution source, a code division multiple access source, a wideband code division multiple access source, a wireless local area network source, or any wireless communication source.

It is further noted that it might be particularly advantageous if the inventive test method further comprises the steps of simulating a further remote video source and surrendering the communication between the remote video source and the device under test to a communication between the further remote video source and the device under test.

In this context, the further remote video source may preferably comprise a long term evolution source, a code division multiple access source, a wideband code division multiple access source, a wireless local area network source, or any wireless communication source.

In addition to this or as an alternative, the test method may further comprise the step of measuring the video quality of the respective video during handover.

Furthermore, the test method may further comprise the step of measuring a number of missed video frames, frame delay, and/or jumbled frames, especially frame order, in order to determine video quality.

Additionally or alternatively, the test method may further comprise the step of determining video quality on the basis of the number of detection patterns having been received by the device under test.

It might be particularly advantageous if the test method further comprises the step of measuring a number of missed video frames, frame delay, and/or jumbled frames, especially frame order, in order to determine video quality during handover.

In addition to this or as an alternative, the test method may further comprise the step of determining video quality during handover on the basis of the number of detection patterns having been received by the device under test.

In this context, the handover may preferably comprise a horizontal handover and/or a vertical handover.

In addition to this, the horizontal handover may especially comprise a handover happening between two cells of the same wireless network.

Furthermore, the vertical handover may preferably comprise an upward vertical handover and/or a downward vertical handover.

Moreover, the upward vertical handover may especially comprise a handover to a wireless network with a larger cell size and a lower bandwidth.

It is further noted that the downward vertical handover may preferably comprise a handover to a wireless network with a smaller cell size and a higher bandwidth.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test system comprising:
a device under test;
a measurement equipment; and
a remote source simulator; and
wherein the remote source simulator is adapted to simulate a remote video source,
wherein the remote video source is adapted to transmit a video comprising at least one detection pattern to the device under test,
wherein the device under test is adapted to display the video,
wherein the measurement equipment is adapted to detect the at least one detection pattern with respect to the device under test and to determine the number of detection patterns having been received by the device under test,
wherein the remote source simulator is further adapted to simulate a further remote video source and to handover the communication between the remote video source and the device under test to a communication between the further remote video source and the device under test,
wherein the handover comprises one or more of an upward vertical handover and a downward vertical handover, and
wherein the upward vertical handover comprises a handover to a wireless network with a larger cell size and a lower bandwidth, and the downward vertical handover comprises a handover to a wireless network with a smaller cell size and a higher bandwidth.

2. The test system according to claim 1, wherein the measurement equipment is further adapted to determine if all detection patterns have been transmitted.

3. The test system according to claim 1, wherein each frame of the video comprises one detection pattern.

4. The test system according to claim 3, wherein each detection pattern comprises a representation of a number being incremented with each frame.

5. The test system according to claim 1, wherein the at least one detection pattern comprises a barcode, a quick response code, or any optical pattern.

6. The test system according to claim 1, wherein the at least one detection pattern comprises an acoustical pattern.

7. The test system according to claim 1, wherein the remote video source comprises a long term evolution source, a code division multiple access source, a wideband code division multiple access source, a wireless local area network source, or any wireless communication source.

8. The test system according to claim 1, wherein the measurement equipment is further adapted to measure the video quality of the respective video during the handover.

9. The test system according to claim 1, wherein the measurement equipment is further adapted to measure a number of missed video frames, frame delay, and/or jumbled frames, especially frame order, in order to determine video quality.

10. The test system according to claim 1, wherein the measurement equipment is further adapted to determine video quality on the basis of the number of detection patterns having been received by the device under test.

11. The test system according to claim 1, wherein the handover comprises a horizontal handover.

12. The test system according to claim 11, wherein the horizontal handover comprises a handover happening between two cells of the same wireless network.

13. A test method comprising:
simulating a remote video source;
transmitting a video comprising at least one detection pattern to a device under test with the aid of the remote video source;
displaying the video with the aid of the device under test;
detecting the at least one detection pattern with respect to the device under test;
determining the number of detection patterns having been received by the device under test;
simulating a further remote video source and handing-over the communication between the remote video source and the device under test to a communication between the further remote video source and the device under test;
wherein the handing-over comprises one or more of an upward vertical handover and a downward vertical handover;
wherein the upward vertical handover comprises a handover to a wireless network with a larger cell size and a lower bandwidth, and the downward vertical handover comprises a handover to a wireless network with a smaller cell size and a higher bandwidth.

* * * * *